Figure 1:
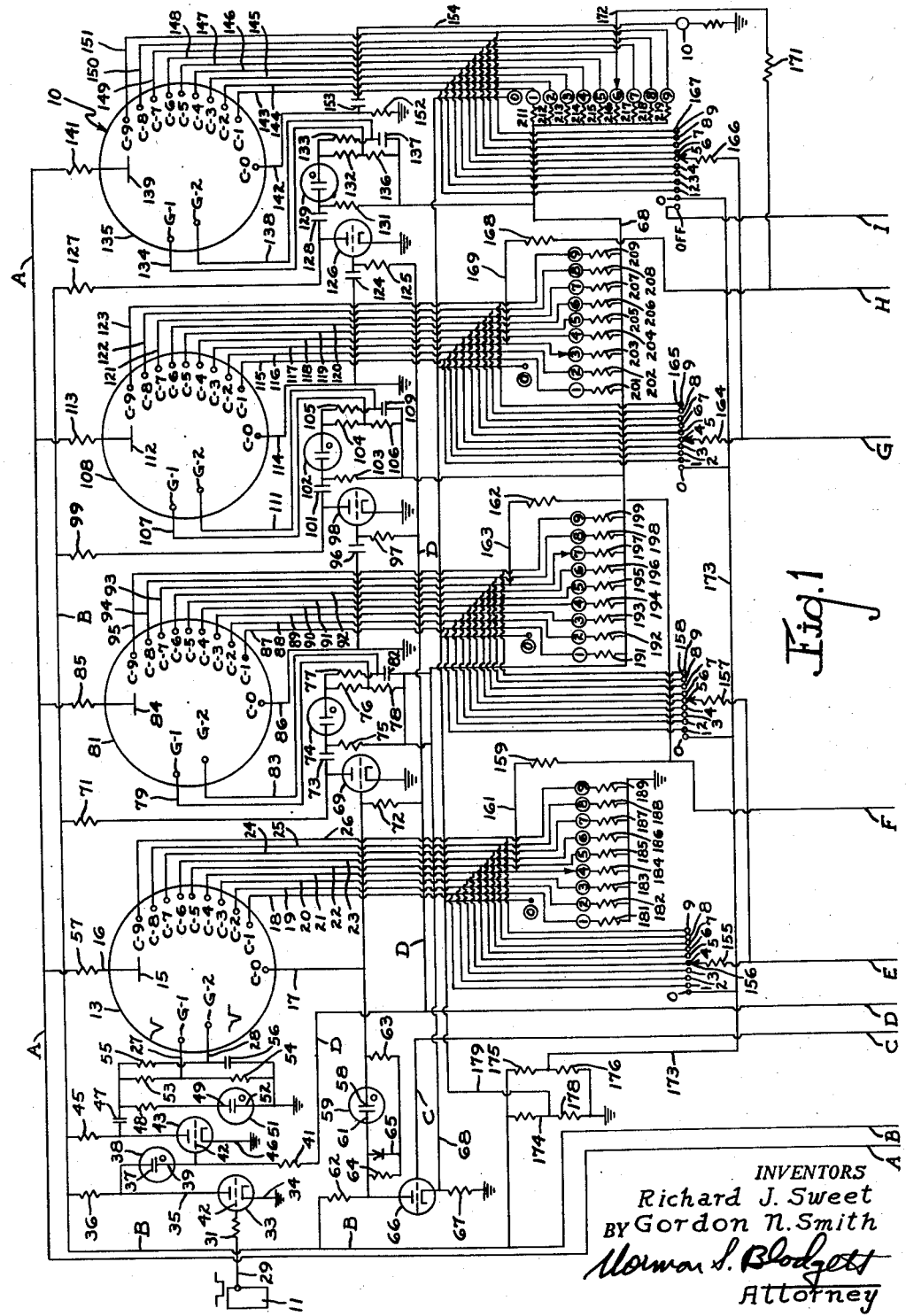

April 5, 1960

R. J. SWEET ET AL 2,931,945

COUNTING APPARATUS

Filed Dec. 2, 1957

3 Sheets-Sheet 1

INVENTORS
Richard J. Sweet
BY Gordon N. Smith

Norman S. Blodgett
Attorney

INVENTORS
Richard J. Sweet
BY Gordon N. Smith
Norman S. Blodgett
Attorney

April 5, 1960 R. J. SWEET ET AL 2,931,945
COUNTING APPARATUS
Filed Dec. 2, 1957 3 Sheets-Sheet 3

INVENTORS
Richard J. Sweet
BY Gordon N. Smith
Norman S. Blodgett
Attorney

United States Patent Office 2,931,945
Patented Apr. 5, 1960

2,931,945
COUNTING APPARATUS

Richard J. Sweet, Northboro, and Gordon N. Smith, North Reading, Mass., assignors to Machinery Electrification, Inc., Northboro, Mass., a corporation of Massachusetts Application December 2, 1957, Serial No. 700,085

18 Claims. (Cl. 315—84.6)

This invention relates to counting apparatus and more particularly to electronic circuitry capable of receiving electrical pulses and performing certain operations after a predetermined number of pulses have been received.

The development of electronic counting tubes and their associated circuitry have brought about a number of problems. There has been considerable difficulty, for instance, in developing a counting circuit which works equally well whether the pulses received are received at a slow rate or a fast rate; while it is a simple enough matter to design circuits which will operate at a slow pulse rate or at a fast pulse rate, no single circuit has been capable of handling both types of counting applications and the range in between. Since the envelope of the received pulses is usually not exactly formed, some difficulty has been experienced with the firing of the tubes. Also, the re-setting of the individual tubes has been somewhat of a problem, particularly those which are required to count at a very high rate of speed. Furthermore, the known counting circuits have been notoriously undependable and require considerable maintenance, with a resultant down-time costs. Usually, a separate custom-built circuit has been required for each application and it has not been possible to provide a standard counter which is applicable to any of a great number of situations. These and other difficulties experienced with the prior art devices have been obviated in a novel manner by the present invention.

It is, therefore, an outstanding object of the present invention to provide a counting apparatus which is capable of operating effectively within a complete range of pulsing rates extending from a very low rate to a very high rate.

Another object of the invention is the provision of a counting apparatus having circuitry assuring positive operation of the counting tubes at all times.

Another object of this invention is the provision of a counting apparatus capable of dependable operation with a minimum of necessary maintenance and a minimum of non-operating time.

A still further object of the instant invention is the provision of a counting apparatus capable of performing a great number of different operations, whereby the need for a specially-built counter for most operations is not necessary.

It is another object of the invention to provide a counting apparatus which is extremely flexible and will operate with photoelectric, semi-conductor, magnetic, or contact-making pickups and in which the wave shape of the input signal pulses is not critical.

With these and other objects in view, as will be apparent to those skilled in the art, the invention resides in the combination of parts set forth in the specification and covered by the claims appended hereto.

Figure 2:
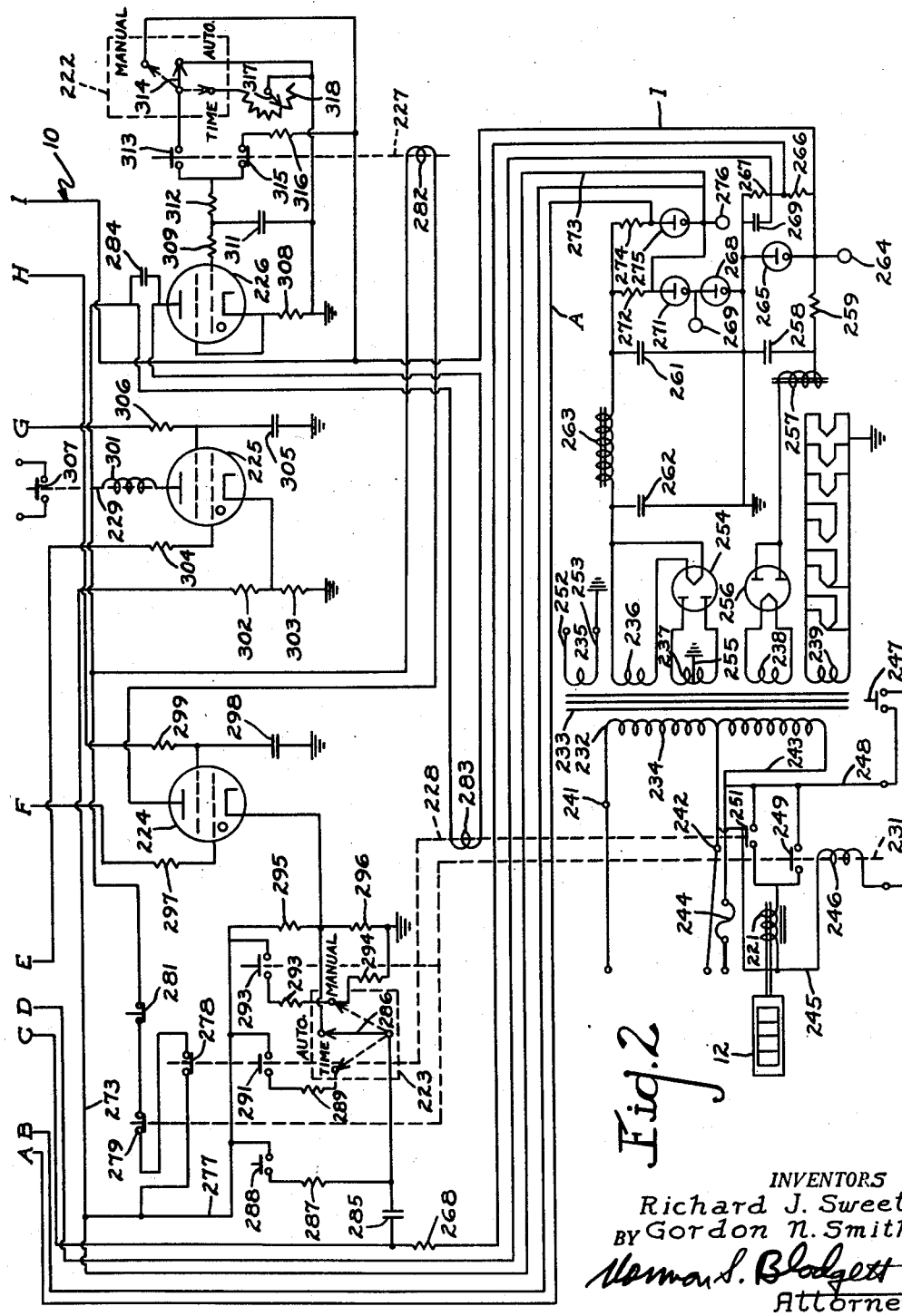
Figure 3:
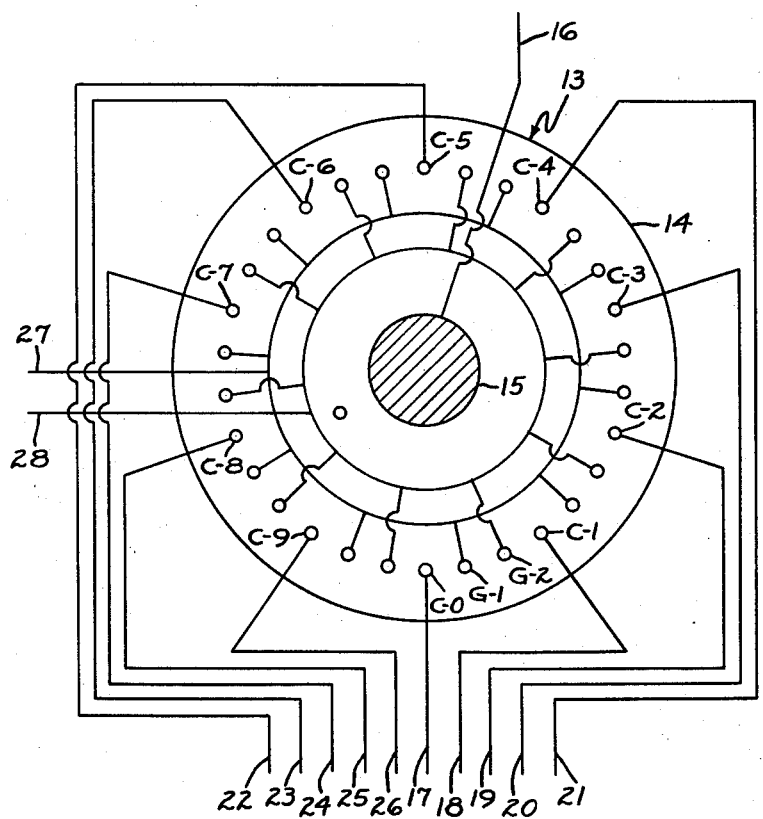

The character of the invention, however, may be best understood by reference to certain of its structural forms, as illustrated by the accompanying drawings in which:

Figure 1 is a schematic view of a portion of a counting apparatus embodying the principles of the present invention, Figure 2 is a schematic view of the remainder of the counting apparatus, and Figure 3 is an enlarged, schematic view of a counting tube used in the apparatus.

Referring to the drawings, it can be seen that the counting apparatus, designated generally by the reference numeral 10, is shown in use with a source 11 of electrical pulses and an actuated member shown, in this case, as a mechanical counting mechanism 12. The source 11 may be a photoelectric, semi-conductor, magnetic or contact-making pickup which sends a negative pulse to the apparatus upon the occurrence of a single event forming part of a series of events. The actuated member 12 may be any one of a number of devices which it is desired to actuate at the end of a predetermined number of events.

Before preceding further with the description of the counting apparatus 10, it might be well to consider the construction of the particular type of counting tube involved. In Figure 3 a counting tube 13 is shown as having a glass envelope 14 containing a centrally-positioned anode 15, having a lead 16 extending exteriorly of the envelope. Ten cathodes numbered, respectively, C–0 to C–9 are spaced at equal intervals in a circle surrounding the anode or plate 15; these cathodes have leads 17 through 26, respectively, leading exteriorly of the envelope 14. Two guide electrodes are spaced between each adjacent pair of cathodes, one of the guide electrodes being closest to one of the cathodes while the other is closest to the other cathode. As one precedes counterclockwise from cathode C–0 to cathode C–1, the guide electrode G–1 is first encountered and then a guide electrode G–2. All of the guide electrodes G–1 are connected to a common lead 27 leading exteriorly of the envelope. In a similar manner, all the guide electrodes G–2 are connected to a common lead 28 leading exteriorly of the envelope. It can be seen, then, that all of the cathodes and guide electrodes are equally spaced about the plate 15 and are also equally spaced about the periphery of the circle thus formed. This tube is of the type manufactured by the Erickson Valve Company, London, England, and designated by the code name GS10C.

Returning again to Figures 1 and 2, the source 11 of pulses is connected by means of a lead 29 through a resistor 31 to the grid 32 of an amplifying tube 33, the cathode 34 of which is connected to ground and the plate 35 of which is connected through a resistor 36 to a cable B. The plate 35 of the tube 33 is also connected to an electrode 37 of a neon tube 38, the other electrode 39 of which is connected through a resistor 41 to a cable D. The electrode 39 of the neon tube 38 is also connected to the grid 42 of an amplifying tube 43, whose plate 44 is connected through a resistor 45 to the cable B. The cathode 46 of the tube 43 is connected to ground. The plate 44 of the tube 43 is also connected through a capacitor 47 to one side of a resistor 48, the other side of which is connected to the plate 49 of a neon tube 51. The other electrode 52 of the neon tube is connected to ground. The common junction point between the capacitor 47 and the resistor 48 is connected to one side of a resistor 53, the other side of which is connected to the lead 27 of the guide electrode G–1 of the counting tube 13. The lead 27 of the guide electrode is also connected to one side of a resistor 54, the other side of which is connected to the electrode 52 of the neon tube 51. The common point shared by the capacitor 47 and the resistors 48 and 53 is also connected to one side of a resistor 55, the other side of which is connected to the lead 28 associated with the guide electrode G–2 of the tube 13.

The lead 28 is also connected through a capacitor 56 to ground. The lead 16 associated with the plate 15 of the tube 13 is connected through a resistor 57 to a cable A.

The lead 17 from the cathode C–0 of the tube 13 is connected to one electrode 58 of a neon tube 59, the other electrode 61 of which is connected through a resistor 62 to the cable B. The electrode 58 of the neon tube 59 is also connected to one side of a resistor 63, the other side of which is connected to one side of a resistor 64 which has its other side, in turn, connected to the electrode 61. A rectifier 65 is connected across the resistor 64, that is to say from the electrode 61 of the tube 59, to the common point of the resistors 63 and 64. The common point shared by the resistors 62 and 64 is connected to the plate of an amplifying tube 66 whose cathode is connected to a resistor 67 to ground. The grid of the tube 66 is connected to a cable C. The cathode of the tube 66 is also connected to a lead wire 68.

The lead 17 associated with the cathode C–0 of the tube 13 is connected to the grid of an amplifying tube 69. The plate of this tube is connected through a resistor 71 to the cable B. The cathode is connected to ground and the grid is connected through a resistor 72 to the cable B. The plate of the tube 69 is also connected to one side of a capacitor 73, the other side of which is connected to one electrode of a neon tube 74. The other side of the capacitor 73 is also connected to one side of a resistor 75. The other electrode of the neon tube 74 is connected to one side each of the resistors 76 and 77. The resistor 76 is connected on its other side to one side of a resistor 78, the other side of which is connected to the other side of the resistor 75 and, also, to the lead wire 68. The common point of the resistors 76 and 78 is connected by a lead 79 to the guide electrode G–1 associated with a counting tube 81. The other side of the resistor 77 is connected to one side of a capacitor 82, the other side of which is connected to the lead wire 68. The common point of the resistor 77 and the capacitor 82 is connected by a lead 83 associated with the guide electrode G–2 of the counting tube 81. The plate 84 of the tube 81 is connected through a resistor 85 to the cable A. The tube 81 is provided with cathodes C–0 to C–9 which are provided with external leads 86 through 95, respectively.

The lead 86 associated with the cathode C–0 of the counting tube 81 is connected to ground and is also connected to one side of a capacitor 96, the other side of which is connected through a resistor 97 to the cable D. The other side of the capacitor 96 is also connected to the grid of an amplifying tube 98, the cathode of which is grounded. The plate of the tube 98 is connected through a resistor 99 to the cable B. The plate of the tube 98 is also connected to one side of a capacitor 101, the other side of which is connected through a resistor 103 to the lead wire 68. The other side of the capacitor 101 is also connected to one electrode of a neon tube 102. The other electrode of the neon tube 102 is connected to one side each of resistors 104 and 105. The other side of the resistor 104 is connected to a lead 107 associated with a guide electrode G–1 of a counting tube 108. The other side of the resistor 104 is also connected to one side of resistor 106, the other side of which is connected to the other side of the resistor 103 and, thus, to the lead wire 68. The other side of the resistor 105 is connected to a lead 111 associated with the guide electrode G–2 of the tube 108. The other side of the resistor 105 is also connected to one side of a capacitor 109, the other side of which is connected to the common point of the resistors 103 and 106 and also to the lead wire 68. The plate 112 of the tube 108 is connected through a resistor 113 to the cable A. The tube 108 is provided with ten cathodes C–0 to C–9 and these, in turn, are provided, respectively, with leads 114 to 123.

The lead 114 associated with the cathode C–0 of the tube 108 is connected to ground and also is connected to one side of a capacitor 124, the other side of which is connected through a resistor 125 to the cable D. The other side of the capacitor 124 is also connected to the grid of an amplifying tube 126, the cathode of which is grounded. The plate of the tube 126 is connected through a resistor 125 to the cable B. The plate of the tube 126 is also connected to one side of a capacitor 128, the other side of which is connected through a resistor 131 to the lead wire 68. The other tube of the capacitor 128 is also connected to one electrode of a neon tube 129, the other electrode of which is connected to one side each of resistors 132 and 133. The other side of the resistor 132 is connected to a lead 134 associated with the guide electrode G–1 of a counting tube 135. The other side of the resistor 132 is also connected to one side of a resistor 136, the other side of which is connected to the other side of the resistor 131 and also, of course, to the lead wire 68. The other side of the resistor 133 is connected to one side of a capacitor 137, the other side of which is also connected to the lead wire 68, along with the resistors 131 and 136. The common point of the resistor 133 and the capacitor 137 is connected to a lead 138 associated with the guide electrode G–2 of the tube 135. The plate 139 of the tube 135 is connected through a resistor 141 to the cable A. The tube 135 is provided with cathodes C–0 to C–9 provided with leads 142 to 151, respectively. The lead 142 associated with the cathode C–0 of the tube 135 is connected to a resistor 152 to ground. It is also connected through a capacitor 153 to a connecting wire 154.

It should be observed that the cables A, B, C, D, E, F, G, H and I shown in Figure 1 are continued into the circuit as shown in Figure 2. The cable A, for instance, is shown as connected to the plate of the counting tubes through suitable resistors. The cable B is connected at various places through suitable resistors to parts of the circuit of Figure 1. The cable C is connected to the grid of the amplifier tube 66. The cable D is connected through a resistor 41 to the grid 42 of the amplifying tube 43 and also to the electrode 39 of the neon tube 38. Cable E is connected through a resistor 155 to a contactor of a multiple switch 156 having ten contact posts. Cable E is also connected through a resistor 157 to the contactor of a multiple switch 158 having contact posts 0 through 9. The cable F is connected through a resistor 159 to the contact arm of a ten-pole switch 161. The cable F is also connected through a resistor 162 to the contactor of a ten-pole switch 163. The contact posts of the switch 163 are numbered 0, 1, 2, 3, 4, 5, 6, 7, 8 and 9. The cable G is connected through a resistor 164 to the contact arm of a ten-pole switch 165. The cable G is also connected through a resistor 166 to the contact arm of an eleven-pole switch 167. Ten of the poles in the switch 165 are numbered 0 through 9, while the eleventh pole is marked "OFF." The cable H is connected through a resistor 168 to the contact arm of a ten-pole switch 169. The cable H is also connected through a resistor 171 to the contact arm of an eleven-pole switch 172 whose contact posts are numbered 0 through 10. Finally, the cable I is connected to the "OFF" contact post of the switch 167. The 0 contact posts of the switches 156, 158, 165 and 167 are connected by a connecting wire 173 to a resistor network 174. One side of a resistor 175 and one side of a resistor 176 are connected together and are connected to the wire 173. One side of a resistor 177 and one side of a resistor 178 are connected together and the common point is connected by a wire 179 to the 0 binding post of the switches 161, 163, 169 and 172. The other side of the resistor 176 is connected to the other side of the resistor 178 and this common point is connected to ground. The other side of the resistor 175 and the other side of the resistor 177 are connected together and are connected to the cable B.

The cathodes C–1 through C–9 of the counting tube 13 are connected, respectively, to the connecting posts 1 through 9 of the switch 161. These same cathodes are connected to the contact posts 1 through 9 of the switch 156. In the same way the cathodes C–1 through C–9 of the counting tube 81 are connected, respectively, to the contact posts 1 through 9 of the switch 163 and are also connected, respectively, to the contact posts 1 through 9 of the switch 158. The cathodes C–1 through C–9 of the counting tube 108 are connected, respectively, to the contact posts 1 through 9 of the switch 169 and are also connected, respectively, to the contact posts 1 through 9 of the switch 165. The cathodes C–1 through C–9 of the counting tube 135 are connected, respectively, to the contact posts 1 through 9 of the switch 172 and are also connected, respectively, to the contact posts 1 through 9 of the switch 167. The contact posts 1 through 9 of the switch 161 are connected, respectively, through resistors 181 through 189 to ground. The contact posts 1 through 9 of the switch 163 are connected through resistors 191 through 199, respectively, to the connecting wire 168. The contact posts 1 through 9 of the switch 169 are connected through resistors 201 through 209, respectively, to the connecting wire 68. The contact posts of the switch 172 are connected through resistors 211 through 219, respectively, to the connecting wire 68.

Referring now to Figure 2, it can be seen that the cables A, B, C, D, E, F, G, H and I are connected into the circuit, as is an actuating solenoid 121 connected to the mechanical counting mechanism 12. Also present in the circuit are a three-way switch 222 and another three-way switch 223. Also associated with the circuit shown are thyratrons 224, 225 and 226. Present in the circuit are a read-out relay 227, an automatic-reset relay 228, an anticipating relay 229 and a manual-reset relay 231. Also present in the circuit is a transformer 232 having a core 233, primary coils 234 and secondary coils 235, 236, 237, 238 and 239. The primary coil 234 has a lead 241 at one end, a center tap lead 242 and another end lead 243. The lead 242 and the lead 243 are connected through a fuse 244 to a source of alternating current electricity, not shown.

A line 245 is connected to the lead 242 through the coil 246 of the manual-reset relay 231 to one side of a manual-reset switch 247. A line 248 leads from the lead 243 of the primary coil of the transformer 232 to the other side of the manual-reset switch 247. One side of the coil of the solenoid 221 is connected to the line 245. The other side is connected through a normally-open contactor 249 of the manual-reset relay 231 to the line 248. The said other side of the coil of the solenoid 221 is also connected to the line 248 through a normally-open contactor 251 of the automatic-reset relay 228.

The secondary coil 235 of the transformer 232 is provided with a lead 252 at one end and a lead 253 at the other end leading to ground. The ends of the coil 235 are connected to the respective ends of the heater cathode of a rectifier tube 254. A center tap 255 is provided on the coil 237 and this center tap is grounded; the ends of the coil are connected to respective plates of the rectifier 254 which has two plates for full-wave rectification. The ends of the secondary coil 238 are connected to the ends of the heater cathode of a rectifier tube 256. The twin plates of this tube are connected together and are connected to one side of a choke coil 257, the other side of which is connected to one side of a capacitor 258 and also to one side of a resistor 259. The other side of the capacitor 258 is connected to one side of a capacitor 261 and also to one side of a capacitor 262. The other sides of the capacitors 261 and 262 are joined by a choke coil 263. The other side of the capacitor 262 is also connected to one of the end leads of the coil 236 between the coil and the heater cathode of tube 254. The other side of the resistor 259 is connected to a binding post 264 and also one electrode of a neon tube 265; the said other side of the resistor 259 is also connected to one side of a resistor 266 and also to the cable I. The other side of the resistor 266 is connected to one side of a resistor 267 and also to one side of a resistor 268, the other side of which is connected to the cable B. The common point of the resistors 266 and 267 is connected to the cable D. A capacitor 269 is connected across the resistor 267. The other side of the resistor 267 is connected to the other anode of the neon tube 265. It is also connected to an anode of a neon tube 268 and to the common point joining the capacitors 258, 261 and 262. The other electrode of the tube 268 is connected to a binding post 269 and also to one electrode of a neon tube 271. The other electrode of the tube 271 is connected through a resistor 272 to the other side of the capacitor 261. The other electrode of the tube 271 is also connected to the cable B and also to a line 273 which is connected to the rest of the circuit in a manner which will be described hereinafter. The secondary coil 239 is connected in the usual manner to the heating filaments of the various tubes inside of the resistor 272 and of the capacitor 261 and are connected through a resistor 274 to one electrode of a neon tube 275, the other electrode of which is connected to a binding post 276. The common point shared by the first electrode of the tube 275 and the resistor 274 is connected to the cable A.

A line 273 is connected to a line 277 which, in turn, is connected to one side of a normally-closed contactor 278 of the automatic-reset relay 228. The other side of the contactor 278 is connected to one side of a normally-closed contactor 279 of the manual-reset relay 231. The other side of the contactor 279 is connected to one side of a manually-operated switch 281, the other side of which is connected to one side of the coil 282 of the read-out relay 227. The said other side of the switch 281 is also connected to one side of the coil 283 of the automatic-reset relay 228. The other side of the coil 282 of the readout relay 227 is connected to the plate of the thyratron 224. The other side of the coil 283 of the automatic-reset relay 228 is connected to the plate of the thyratron 226 and a capacitor 284 is connected across this coil. The cable C is connected at a point on the side of the resistor 268, which is away from the common point between the resistors 266 and 267, to one side of a capacitor 285, the other side of which is connected to the contacting arm 286 of the three-way switch 223. The other side of the capacitor 285 is also connected through a resistor 287 to one side of a switch 288 which switch is normally open. The other side of the switch 288 is connected to the line 277. The contact arm 286 of the switch 223 is capable of moving to and making contact with one of three posts marked Manual, Automatic and Time. The Time post is connected through a resistor 289 to one side of a normally-open contactor 291 of the automatic-reset relay 228, the other side of the contactor being connected to the line 277. The Manual post of the switch 223 is connected through a resistor 292 to one side of a normally-open switch 293, the other side of which is connected to the line 277. The Manual post is also connected through a resistor 294 to ground. The other side of the switch 293 and the line 277 are connected to one side of a resistor 295. The other side of the resistor 295 is connected to one side of a resistor 296, the other side of which is connected to ground. The point common to the resistors 295 and 296 is connected to the Automatic post of the switch 223 and also to the cathode of the thyratron 224.

One of the grids of the thyratron 224 is connected through a resistor 297 to the cable F. The other grid is connected through a capacitor 298 to ground and also is connected through a resistor 299 to the cable H. The side of the switch 281 which is connected to the automatic-reset relay coil 283 is also connected to one side of the coil 301 of the anticipating relay 229. The other side of the coil 301 is connected to the plate of the thyratron 225. The cathode of the thyratron 225 is connected to the mid-point of resistors 302 and 303. The other side of the resistor 303 is connected to ground, while the other side of the resistor 302 is connected to the line 273. One grid of the thyratron 225 is connected through a resistor 304 to the cable E. The other grid of the thyratron 225 is connected through a capacitor 305 to ground. It is also connected through a resistor 306 to the cable G. It should be noted at this point that the relay 229 is provided with a normally-open contactor 307 which is connected to exterior binding posts capable of use in control of elements associated with the counting apparatus in a manner which will be described hereinafter.

The cathode of the thyratron 226 is connected to one of the grids and is also connected through a resistor 308 to ground. The other grid of the thyratron 226 is connected to one side of a resistor 309, the other side of which is connected to one side of a capacitor 311 the other side of which is connected to the ground side of the resistor 308. The common point between the capacitor 311 and the resistor 309 is connected to one side of a resistor 312, the other side of which is connected through a normally-closed contactor 313 of the readout relay 227 to the contact arm 314 of the three-way switch 222. The three-way switch 222 is provided with three contact posts all capable of being contacted one at a time by the actuating arm 314; one of the posts is labeled Manual, another Automatic and a third Time. The other side of the resistor 312 is also connected through a normally-closed contactor 315 of the readout relay 227 to one side of a resistor 316, the other side of which is connected to the cable I. The side of the resistor 316 which is connected to the cable I is also connected to the Manual post of the switch 222. The grounded side of the capacitor 311 is connected to the actuating arm 317 of a potentiometer 318 and is also connected to the Automatic post of the switch 222. The resistor element of the potentiometer 318 is connected at one end to the Time post of the switch 222.

The operation of the apparatus of the invention will now be readily understood in view of the above description. Before beginning the operation of the circuit, however, it will be well to consider the operation of the counting tube 13 as illustrated in Figure 3. The tube 13 is a neon-filled tube capable of ionic arcing between the plate 15 and any one of the ten cathodes C–0 to C–9, any one of the ten guide electrodes G–1, and any one of the ten guide electrodes G–2. Generally speaking, the arc will travel between the plate 15 and the electrode with the greatest negative charge or, in other words, the lowest voltage. If more than one electrode has the same low voltage the arc will move to that low voltage electrode which is closest to its present position. In other words, the arc will not move from one electrode to another unless that other electrode has a lower voltage than the electrode on which the arc is presently situated, nor will it move to this other electrode unless the other electrode is closer to the arc's present position than a still further electrode having the same low voltage. Let us assume that the arc exists between the plate 15 and the cathode C–0, as it will do before counting begins. If a voltage is placed on the electrode G–1 which is lower than the voltage on the cathode C–0 the arc will move to the guide electrode G–1. If at a later time a voltage is placed on the guide electrode G–2 which is lower than the voltage on the guide electrode G–1, the arc will move to the guide electrode G–2. If a positive charge is put on the two guide electrodes G–1 and G–2, and the cathodes C–0 and C–1 are left at the same voltage, the arc will wish to move to one of the cathodes C–0 or C–1 because their voltage is more negative than the voltage presently on either of the guide electrodes G–1 or G–2. The arc, of course, now extends between the plate 15 and the guide electrode G–2. Since the cathode C–1 is closer to the present position of the arc than the cathode C–0, the arc moves to the cathode C–1. If it is a negative pulse which has brought about this movement of the arc from the position extending between the plate 15 and the cathode C–0 to the position extending between the plate 15 and the cathode C–1, the pulse has been counted by the movement of the arc to its new position. In the same way, if every negative pulse entering the circuit causes the arc to move from one cathode to the next one, the tube is performing the function of "counting." Returning now to Figures 1 and 2, in which it is understood that the counting tubes 81, 108 and 135 are exactly similar to counting tube 13 and that the tubes as shown in Figure 1 are merely schematic and do not represent the true arrangement of the elements, which arrangement is shown in Figure 3, a negative pulse of electricity is received on the line 29 from the source 11. This source may be a photoelectric cell which, when an article, such as a package, passes on a moving belt between the elements of the photoelectric apparatus, produces a negative pulse of electricity. However, these pulses may represent the occurrence of any number of different kinds of events and it is the purpose of the counting apparatus to produce an effect such as the stoppage of a conveyor or the closing of a door or the like at the end of a predetermined number of such events. In the preferred embodiment the apparatus is constructed to permit the predetermined number of events to be any number from zero to 9,999. For that purpose it is necessary for the operator to set the switches 161, 163, 169 and 172 to indicate the particular number desired. In Figure 1 it can be seen that the predetermined number has been set by moving the actuating arms of the switches to the proper contact posts. In switch 161 the arm is set on post 4; in the switch 163 it is set on post 7; in switch 169 it is set on post 3 and in switch 172 it is set on post 6, so that the number thus selected is "6,374." The apparatus is provided with a warning arrangement in order that, before the first predetermined number is reached and certain action is taken by the apparatus, it is possible to take a preceding action which may act as a warning. For that purpose the contact arms associated with the switches 156, 158, 165 and 167 are set to a predetermined number which is lower than the number set on the previous switches. In Figure 1, it can be seen that the warning circuits have been set for the number "5,454." Now, the negative pulse which arrived at the line 29 passes through the resistor 31 and appears on the grid 32 of the amplifying tube 33. The pulse, after being amplified in the tube 33, appears across the neon tube 38. It is a characteristic of neon tubes that they do not fire until a voltage of a certain magnitude appears across their electrodes. Therefore, the neon tube does not pass the pulse until a fairly high voltage is reached and this has the result of sharpening the wave form of the pulse. The pulse, then, appears on the grid 42 of the amplifying tube 43 in which it is amplified still further. The pulses through the capacitor 47 and through the resistor 53 and appears upon the guide electrode G–1. It, of course, appears on all ten of the actual guide electrodes, but the one with which we are concerned is the one located adjacent, in a counterclockwise direction, to the cathode C–0. The tube is firing in a stream from the plate 15 to the cathode C–0 which has no voltage appearing upon it. However, up to now there has been no reason for the stream to move to any other part of the tube and so it stays in its original position. However, the appearance of the negative pulse on the guide electrode G–1 causes the stream to jump to G–1. The pulse which appears on G–1 also divided off and appears on the guide electrode G–2. However, because of the selection of the size of the resistor 55 and the value of the capacitor 56 to ground, the pulse did not appear on G–2 until some small time after it appears on G–1. However, when it does appear, the pulse has disappeared from the guide electrode G–1 so that the stream of electrons or ionized gas next jumps to the guide electrode G–2. Eventually, the charge disappears from the guide electrode G–2 and the ionized stream is forced to jump to the cathode G–1 in a manner which will be described hereinafter. It will be understood that the pulse will pass through the capacitor 47 and the resistor 53 to the guide electrode G–1 in pretty much the same form, or wave form, as it originated in the amplifier 43. However, part of the pulse passes through the resistor 48 and is building up a charge across the neon tube 51. As soon as the voltage across the neon tube reaches its ionization potential, the tube will fire. The resistor 48 is selected at a relatively low value and this will change the RC constant of the circuit that involves the guide electrode G–1. This means that the charging time of the capacitor 47 will be lessened and the slope of the wave form will be increased very greatly. This gives the pulse form on G–1 a very sharp forward face which assures that the stream will jump to G–1 when the pulse reaches it and will jump to G–2 when the pulse reaches that guide electrode. This not only prevents the tube from acting sluggishly but also assures that movement between cathodes C–0 and C–1 takes place at every pulse and that no pulse is omitted, resulting in a miscounting. Now, the pulse which reaches G–2 is also sharpened by the neon tube 51, but part of the static electrical charge goes to charge the capacitor 56. As soon as the pulse is passed the voltage on G–2 returns to zero, but because of the charge remaining on the capacitor 56 which leaks not only to ground, but also to G–2 the voltage goes on past the zero value and up into positive value. This has the effect of pushing the stream of ionized gas away from the guide electrode G–2 and since the nearest other electrode is the cathode C–1, the stream jumps to C–1. Every time the stream of ionized gas passes between the plate 15 and the cathode which has been selected by means of the contact arm of the switch 161, a voltage appears on the contact posts making up the switch. This is because the firing of the tube causes current to pass into the cathode through the lead to ground through one of the resistors in series with the lead. For instance, in the case shown in Figure 1, the switch 161 is set at Number 4. When the stream of electrons feeds to C–4, current passes down through the lead 21 through the pin 4 and through the resistor 184 to ground. This causes a voltage to appear at the pin 4 because of the resistor 184. This voltage is carried into the cable F and, therefore, passes through the resistor 297 on to the lower grid of the thyratron 224. If this does not result in the termination of the counting operation, the stream of ionized gas continues to rotate around from one cathode to the other in the tube 13, but every time that it lands on the cathode C–4 this same voltage appears on the grid of the tube 224. Every time the stream arrives at the cathode C–0 of the tube 13, current is permitted to pass to ground through the resistor 72 and this causes a pulse to appear on the amplifying tube 69. This pulse passes through the capacitor 73 and the neon tube 74 to the guide electrode G–1 of the counting tube 81, first, however, passing through the resistor 76. The pulse also passes through the resistor 77 to the guide electrode G–2, but the time constant is such that the pulse arrives at G–2 long after it has arrived at G–1, thus causing the stream to pass from C–0 to C–1, if this is the first pulse which tube 81 is counting. The neon tube 74 will not permit the passage of the pulse until the voltage across it has reached its ionization potential and this has the effect of sharpening the pulse and permitting better operation of the tube 81. The capacitor 82 has the effect of causing the guide electrode G–2 to go slightly positive after the main pulse has passed, thus forcing the stream over to the adjacent cathode C–1. After the stream has passed from one cathode to another entirely around the tube 81 and arrived at the cathode C–0 again, the arrival of the stream at the cathode C–0 causes a pulse to pass down through the lead 86 and appear on the grid of the amplifying tube 98. This pulse acts in the same way on the associated circuits of the tube 108 and causes the stream in that tube to leave cathode C–0 and arrive at cathode C–1. Passage of the stream entirely around the tube 108 and rearriving at cathode C–0 causes a pulse to arrive on the grid of the amplifying tube 126 which causes the tube 135 to make a single pulse count. It can be seen, then, that the tube 13 counts every single pulse that arrives on the lead 29, while the tube 81 counts every tenth pulse. The tube 108 counts every hundredth pulse and the tube 135 counts every thousandth pulse. From this it can be seen, then, that the only tube of the four which must operate at a high rate of speed is the tube 13 and that is the reason why its pulse-sharpening circuit is different from the pulse-sharpening circuit associated with the other tubes. It also can be seen that every time the stream arrives at the cathode associated with the contact pin of the switch which is connected to that tube, a voltage will appear on the contact arm of that switch. For instance, when the stream arrives at the contact pin 7 of the switch 163 a voltage will appear on the contact arm of that switch and will be passed through the resistor 152 on to the cable F. In the same way, when the stream reaches the cathode C–3 of tube 108 a voltage will appear across the contact arm of the switch 169 and will pass through the resistor 168 to the cable H. Similarly, when the stream reaches the cathode C–6 of the tube 135, a voltage appears on the contact arm of the switch 172 and passes through the resistor 171 and appears on the cable H.

Turning now to Figure 2, it will be seen that cable F is attached to one of the grids of the thyratron 224 while the cable H is connected to the resistor 299 to the other grid of that same tube. It is the nature of the thyratron that when the voltage on the grids is of sufficient value the tube will fire. The values of the resistors 297 and 299, etc., are selected so that the firing point of the tube 224 is not reached until all of the voltages appearing at all of the switches 161, 163, 169 and 172 are present on the tube at the same moment. This will occur when the streams in the tubes 13, 81, 108 and 135 have all reached the cathode associated with the pin with which the contact arm of the switches has been set. When, therefore, the preset number of pulses have arrived on the lead 24 from the source 11 and the streams have revolved around in the tube until they have reached the preselected cathode positions, the four voltages will appear on the grids of the thyratron 224 and the tube will fire. Firing of the tube causes flow of current through the coil 282 of the readout relay 227. The circuit through which the flow takes place is as follows: the flow passes from the cathode to the plate through the coil 282 into the line associated with the switch 281, through the normally-closed switch 281, through the normally-closed contactor 279, through the normally-closed contactor 278 to the line 277, and through the line 277 and the resistor 295 to the cathode.

In the same way, voltages will appear on the cables E and H every time the stream strikes the cathode associated with the contact pin to which the switches 156, 158, 165 and 167 have been set. When the predetermined number of pulses have entered the lead 29 the streams of the tubes will be dialed around to the proper cathodes and corresponding signals will appear on these cables E and H. These, in turn, will be transmitted to the grids of the thyratron 225. When all four voltages appear simultaneously on the grids, the firing point of the tube will have been reached and the tube will fire. Current passing from the cathode to the plate through the coil 301 of the relay 229, through the switch 281, through the normally-closed contactor 279, through the normally-closed contactor 278, through the line 273 and the resistor 302 to the cathode. The energization of the readout relay 227 causes an opening of the normally-closed contactors 313 and 315 associated therewith. This causes a leakage to ground of the negative voltage appearing on the grid of the thyratron 226, the negative voltage being applied from cable I. Eventually the negative voltage will be reduced enough to cause the firing of the tube and current will pass from the plate through the reset coil 283 of the reset relay 228. It can be seen, then, that when the stream of electrons in the tubes 13, 81, 108 and 135 reach the points set on the switches 161, 163, 169 and 172, the tube 224 will fire and cause the energization of the readout relay 227. When the stream reaches the points set on the switches 156, 158, 165 and 167, this will cause the firing of the thyratron 225 and the energization of the anticipating relay 229. Depending on the setting of the circuit, the thyratron 226 will, on occasion, fire and cause the energization of the automatic reset relay 228. The only other relay in this circuit is the manual-reset relay 231 whose coil is energized by a manual depression of the switch 247.

It will be observed that when the contacting arm 314 of the switch 222 is set on Automatic, the reset thyratron 226 will energize the automatic-reset relay 228 almost immediately after the readout relay 227 is energized. If, however, the contacting handle 314 is set to the Time pin the rise of voltage on the grid of the tube 226 will be slower, depending on the setting of the contacting arm 317 of the potentiometer 318. This means that the automatic-reset relay 283 will be energized at a predetermined time following the energization of the readout relay 227.

The thyratron 226 is normally prevented from firing because of the high negative voltage on its grid. This voltage originates in the connection through the resistor 309, the resistor 312, the normally-closed contactor 315, the resistor 316 and the cable I which goes back into the power pack of the circuit. Upon the energization of the readout relay 227 the contactors 315 open, while the contactors 313 close. This disconnects the grid from the low voltage source to which it had been formerly connected. Then, if the contactor on 314 is set either on Time or on Automatic the charge on the grid will leak back into ground. It will do that instantaneously if the contactor arm is set on Automatic or it will do it after a preset period of time if it is connected to Time. If, however, it is connected to Manual the grid remains connected to the cable I with its low voltage charge and the tube will not fire. The circuit is then reset by manually operating the switch 247, thus energizing the manual-reset relay 231. The energization of the anticipating relay 229 operates to close the normally-open contactor 307 and this is connected to an external circuit to perform a desired function; for instance, a light may be turned on indicating that the end of the main count is approaching so that the conveyor upon which articles are moving may be slowed down to give a more accurate final main count.

Every time the circuit is reset, that is to say, the count is turned back to zero, the actuating arm of the mechanical counting mechanism 12 is moved by the solenoid 221. This is because when the automatic-reset relay 228 is energized the normally-open contactor 251 closes, thus causing current to flow through the coil of the solenoid 221 from the line 245 to the line 248 which lines are, in turn, connected to the power lines. When resetting is accomplished manually, the actuation of the switch 247 energizes the coil 246 of the manual-reset relay 231. This, among other things, causes the closing of the normally-open contactors 249 and causes current to flow through the solenoid in the same way. When the reset is on Time, of course, the mechanical count will be made in the same way as with automatic reset. The mechanical counter, therefore, will show the number of complete cycles of counting that have taken place since the last setting of the mechanical counting mechanism.

Generally speaking, the three-way switch 222 is concerned with resetting the thyratrons 224, 225 and 226 as well as returning the various relays to their original positions before the counting cycle began. The switch 223 is concerned with resetting the counting tubes. It will be understood, of course, that there are times, for instance, when it may be desirable to have the thyratrons and relays reset at a different time after the readout point in the time in which the counting tubes are reset. The line 277 is connected to the line 273 which, in turn, is attached to the binding post 276 associated with the neon tube 275 in the power section of the apparatus and, therefore, supplies a voltage in the order of 300 volts when the power source connected between the leads 242 and 243 on the transformer 232 is approximately 115 volts A.C. This voltage on the line 277 is divided by the resistors 295 and 296 so that normally a voltage of around 45 volts appears at their common point. When the thyratron 224 fires, however, the voltage at the common point between the resistors 295 and 296 goes up to around 200 volts. When the switch 223 is set on automatic this voltage, of course, is fed through the capacitor 285 and appears on the cable C. This cable is, of course, attached to the grid of the amplifying tube 66 which is connected so as to invert the pulse, producing a negative pulse which travels through the neon tube 59 to the lead 77 connected to the cathode C-0. The neon tube 59 produces a very sharp peak pulse, while the rectifier 65 assures that no positive components of signal are sent to the cathodes C-0. The net effect is that the stream of ionized gas immediately jumps to the cathode C-0 and the tube 13 is in condition to begin counting from zero again. When the tube 66 fires, however, a strong positive voltage appears at the cathode side of the resistor 67. This strong positive voltage is carried along the line 68 and is impressed on all of the cathodes of the tubes 81, 108 and 135, except the cathodes C-0 of those tubes. In these tubes the cathodes C-0 are thus at so low a voltage that the stream of ionized gas immediately is directed to that cathode and the tubes are in condition for counting again.

When the contact arm 286 of the switch 223 is set on Manual the voltage from the line 277 to ground is divided between the resistors 292 and 294, but only when the normally-open contactor 293 is closed. This contactor is closed, of course, when the operator has pressed the switch 247 and energized the relay 231. Once this has been done, the counting tubes are reset in the manner described above in connection with the Automatic position. When the actuating arm 286 of the switch 323 is set on Time position the same sort of action takes place, but only when the normally-open contactor 291 is closed. The contactor is closed when the automatic-reset relay 228 is energized and this takes place only when the tube 226 is firing, which event takes place immediately after readout or at a predetermined time after readout, depending on whether the arm 314 of the switch 22 is on Automatic or Time. Various arrangements of the switches 222 and 223 are possible in order to take care of unusual control situations.

It will be well now to explain some of the operation of the circuits associated with the transformer 232. Assuming that 115 volts A.C. is impressed across the lines 242 and 243, the rectified current will appear across the rectifying network formed by the choke 263 and the capacitors 262 and 261. This voltage will be in the order of 400 volts D.C. The neon tubes 271, 268, 265 and 275 are voltage regulator tubes and have the ability to change resistance with change in current to produce constant voltage across their electrodes. The elements associated with these neon tubes, and the tubes themselves, break down the 400 volts which appear at the output of the rectifier tube 254 and in the preferred embodiment, furnish the binding post 269 with 150 volts D.C. and the binding post 276 with 300 volts D.C. The binding post 264 is provided with —150 volts D.C.

It will be understood that the energization of the automatic-reset relay 228, when the tube 226 fires, will open the normally-closed contactor 278, thus opening the plate circuits of the thyratrons 224, 225 and 226 and causing them to return to their original conditions with no firing taking place. This same resetting of the thyratrons can be accomplished by the manual switch 281 if so desired and, of course, it is accomplished when the resetting is done manually by depression of the switch 247 which acts through the relay 231 to open the contactors 279. Stopping the thyratrons from firing, of course, causes the de-energization of the relay coils in their plate circuits so that the relays are returned to their former unactivated condition.

It should be pointed out that the neon tube 51 associated with the counting tube 13 performs two functions. As has been explained above, it contributes the ability to sharpen the triggering pulse so that a more positive action takes place in the tube. It also provides a quick recharge path for the capacitor 47 along with an inherent quality of changing its resistance with frequency. The latter characteristic is usable in obtaining the correct amplitude pulse for proper counting.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A counting apparatus for counting electrical pulses, comprising a counting tube having a first and a second guide electrode, a first capacitor on one side of which each pulse is impressed, first and second resistors in series connecting the other side of the capacitor to ground, the common sides of the resistors being connected to the first guide electrode, a third resistor and a second capacitor in series connecting the said other side of the first capacitor to ground, the common sides of the third resistor and the second capacitor being connected to the second guide electrode, a fourth resistor and a gas-filled diode connected in series from the said other side of the first capacitor to ground, the diode serving to increase the slope of the front side of each pulse and provide a quick recharge path for the first capacitor.

2. A counting apparatus for counting negative electrical pulses, comprising a counting tube having a first and a second guide electrode, a first capacitor on one side of which each pulse is impressed, first and second resistors in series connecting the other side of the capacitor to ground, the common sides of the resistors being connected to the first guide electrode, a third resistor and a second capacitor in series connecting the said other side of the first capacitor to ground, the said second capacitor being connected directly to ground, the common sides of the third resistor and the second capacitor being connected to the second guide electrode, a fourth resistor and a neon tube connected in series from the said other side of the first capacitor to ground, the third resistor being considerably larger than the first resistor to cause a given pulse to reach the first guide electrode before it reaches the second guide electrode, the neon tube serving to increase the slope of the front side of each pulse and also to provide a quick recharge path for the first capacitor, the second capacitor causing the second guide electrode to go slightly positive at the end of each pulse.

3. A counting apparatus for counting electrical pulses, comprising a counting tube having a first and a second guide electrode, a source of negative pulses, an amplifying tube on whose grid each pulse is impressed for amplification, a second amplifying tube on whose grid is impressed the output of the first amplifying tube, a neon tube inserted between the plate of the first amplifying tube and the grid of the second amplifying tube, a first capacitor one side of which is connected to the plate of the second amplifying tube, first and second resistors in series connecting the other side of the capacitor to ground, the common sides of the resistors being connected to the first guide electrode, a third resistor and a second capacitor in series connecting the said other side of the first capacitor to ground, the common sides of the third resistor and the second capacitor being connected to the second guide electrode, a fourth resistor and a gas-filled diode connected in series from the said other side of the first capacitor to ground, the diode serving to increase the slope of the front side of each pulse and also to provide a quick recharge path for the first capacitor.

4. A counting apparatus for counting electrical pulses, comprising a counting tube having a first and a second guide electrode, a first capacitor on one side of which each pulse is impressed, a gas-filled diode connected on one side to the other side of the first capacitor, first and second resistors in series connecting the other side of the diode to a low-voltage point, the common sides of the first and second resistors being connected to the first guide electrode, a third resistor and a second capacitor in series connecting the said other side of the diode to the low-voltage point, the common sides of the third resistor and the second capacitor being connected to the second guide electrode, the diode serving to increase the slope of the front side of each pulse.

5. A counting apparatus for counting electrical pulses, comprising a counting tube having a first and a second guide electrode, a first capacitor on one side of which each pulse is impressed, a gas-filled diode connected on one side to the other side of the first capacitor, first and second resistors in series connecting the other side of the diode to a low-voltage point, the common sides of the first and second resistors being connected to the first guide electrode, a third resistor and a second capacitor in series connecting the said other side of the diode to the low-voltage point, the common sides of the third resistor and the second capacitor being connected to the second guide electrode, and a fourth resistor connected on one side to the common point between the first capacitor and the diode and on the other side to the low-voltage point, the diode serving to increase the slope of the front side of each pulse.

6. A counting apparatus for counting electrical pulses, comprising a counting tube having a first and a second guide electrode, a first capacitor on one side of which each pulse is impressed, a neon tube connected on one side to the other side of the first capacitor, first and second resistors in series connecting the other side of the neon tube to a low-voltage point, the common sides of the first and second resistors being connected to the first guide electrode, a third resistor and a second capacitor in series connecting the said other side of the neon tube to the low-voltage point, the second capacitor being connected directly to ground, the common sides of the third resistor and the second capacitor being connected to the second guide electrode, and a fourth resistor connected on one side to the common point between the first capacitor and the neon tube and on the other side to the low-voltage point, the third resistor being greater in value than the first resistor in order to produce a lag between the arrival of the pulse on the first guide electrode and its arrival at the second guide electrode, the neon tube serving to increase the slope of the front side of each pulse, the second capacitor causing the second guide electrode to go slightly positive at the end of each pulse.

7. A counting apparatus for counting electrical pulses, comprising a counting tube having a plate and a plurality of cathodes spaced about the plate, one of the cathodes being a zero cathode, means providing a reset pulse, a capacitor to one side of which the reset pulse is impressed, a gas-filled diode connected on one side to the other side of the capacitor and on the other side to the zero cathode, a first resistor connecting the common point between the capacitor and the diode to ground, a rectifier connecting the said common point to ground and permitting flow of electrical current only from the said common point to ground.

8. A counting apparatus for counting electrical pulses, comprising a counting tube having a plate and ten cathodes evenly spaced about the plate, one of the cathodes being a zero cathode, means providing a reset pulse, a capacitor to one side of which the reset pulse is impressed, a gas-filled diode connected on one side to the other side of the capacitor and on the other side to the zero cathode, a first resistor connecting the common point between the capacitor and the diode to ground, a rectifier connecting the said common point to ground and permitting flow of electrical current only from the said common point to ground, and a second resistor connecting the zero cathode to ground.

9. A counting apparatus for counting electrical pulses, comprising a glow-discharge counting tube having a plate and ten cathodes evenly spaced about the plate, one of the cathodes being a zero cathode, means providing a reset pulse to render the zero cathode much more attractive to the glow-discharge than the other cathodes, a capacitor to one side of which the reset pulse is impressed, a neon tube connected on one side to the other side of the capacitor and on the other side to the zero cathode, a first resistor connecting the common point between the capacitor and the neon tube to ground, a rectifier connecting the said common point to ground and permitting flow of electrical current only from the said common point to ground, and a second resistor connecting the zero cathode to ground, the neon tube serving to sharpen the pulse and thus insure positive and instantaneous attraction of the glow-discharge to the zero cathode.

10. A counting apparatus for counting electrical pulses, comprising a glow-discharge counting tube having a plate and ten cathodes evenly spaced about the plate, one of the cathodes being a zero cathode, means providing a strong negative pulse to render the zero cathode much more attractive to the glow-discharge than the other cathodes, said means including a source of a positive pulse, an amplifying tube connected as a cathode follower upon whose grid the positive pulse is impressed, the output of the amplifying tube being in the form of a strong negative pulse, a capacitor to one side of which the strong negative reset pulse is impressed, a neon tube connected on one side to the other side of the capacitor and on the other side to the zero cathode, a first resistor connecting the common point between the capacitor and the neon tube to ground, a rectifier connecting the said common point to ground and permitting the flow of current only from the said common point to ground, and a second resistor connecting the zero cathode to ground, the neon tube serving to sharpen the form of the negative reset pulse to insure positive and instantaneous attraction of the glow-discharge to the zero cathode.

11. A counting apparatus for counting electrical pulses, comprising a series of counting tubes, each tube having a series of cathodes, a resistor connecting each cathode to ground, a contact arm associated with each counting tube and adapted to make electrical contact with a point between one of the cathodes of the counting tube and its resistor, a gas-filled tube having a plurality of grids, each of the contact arms being connected to a grid, the resistors being selected of such values that the voltages present on the grids due to the presence of the counting tube discharges on the cathodes will be sufficient to fire the tube only when the discharges of all the counting tubes are directed to the cathodes with which the contact arms make electrical contact.

12. A counting apparatus for counting electrical pulses, comprising a series of glow-discharge counting tubes, each tube having a series of cathodes, a resistor connecting each cathode to ground, a contact arm associated with each counting tube and adapted to make electrical contact with a point between one of the cathodes of the counting tube and its resistor, a thyratron having a plurality of grids, each of the contact arms being connected to a grid, a resistor associated with each contact arm, the resistors being selected of such values that the voltages present on the grids due to the presence of the counting tube glow-discharges on the cathodes will be sufficient to fire the thyratron only when the glow discharges of all the tubes are directed to the cathodes with which the contact arms make electrical contact.

13. A counting apparatus for counting electrical pulses, comprising a series of four glow-discharge counting tubes, each tube having a series of ten cathodes, a resistor connecting all but one of the cathodes to ground, a contact arm associated with each counting tube and adapted to make electrical contact with a point between one of the cathodes of the counting tube and its resistor, a thyratron having two control grids, two of the contact arms being connected to one grid and the other two contact arms being connected to the other grid, a resistor associated with each grid, the resistors being selected of such values that the voltages present on the grids due to the presence of the counting tube glow discharges on the cathodes will be sufficient to fire the thyratron only when the glow discharges of all the tubes are directed to the cathodes with which the contact arms make electrical contact.

14. A counting apparatus for counting electrical pulses, comprising a series of glow-discharge counting tubes, each tube having a series of cathodes, a resistor connecting each cathode to ground, a contact arm associated with each counting tube and adapted to make electrical contact with a point between one of the cathodes of the counting tube and its resistor, a thyratron having a plurality of grids, each of the contact arms being connected to a grid, a resistor associated with each contact arm, the resistors being selected of such values that the voltages present on the grids due to the presence of the counting tube glow discharges on the cathode will be sufficient to fire the thyratron only when the glow discharges of all the tubes are directed to the cathodes with which the contact arms make electrical contact, a readout relay having its coil in the plate circuit of the thyratron, a reset circuit for returning the glow discharge of the counting tubes to the zero cathode the said reset circuit being energized by a coil which is energized by the readout relay.

15. A counting apparatus for counting electrical pulses, comprising a first counting tube having a first and a second guide electrode, a first capacitor on one side of which each pulse is impressed, first and second resistors in series connecting the other side of the capacitor to ground, the common sides of the resistors being connected to the fourth guide electrode, a third resistor and a second capacitor in series making the said other side of the first capacitor to ground, the common sides of the third resistor and the second capacitor being connected to the second guide electrode, a fourth resistor and a gas-filled diode connected in series from the said other side of the first capacitor to ground, the diode serving to increase the slope of the front side of each pulse and also to provide a quick recharge path for the first capacitor, a second counting tube having a first and a second guide electrode, a third capacitor on one side of which is impressed a pulse originating in the first counting tube on occasion, a second gas-filled diode connected on one side to the other side of the third capacitor, fifth and sixth resistors in series connecting the other side of the second diode to a low-voltage point, the common sides of the fifth and sixth resistors being connected to the first guide electrode of the second counting tube, a seventh resistor and a fourth capacitor in series connecting the said other side of the second diode to the low-voltage point, the common sides of the seventh resistor and the fourth capacitor being connected to the second guide electrode of the second counting tube, and a fifth resistor connected on one side to the common point between the third capacitor and the second diode and on the other side to the low-voltage point, the second diode serving to increase the slope of the front side of each pulse originating in the first counting tube.

16. A counting apparatus for counting electrical pulses, comprising a first counting tube having a first and a second guide electrode, a first capacitor on one side of which each pulse is impressed, first and second resistors in series connecting the other side of the capacitor to ground, the common sides of the resistors being connected to the first guide electrode, a third resistor and a second capacitor in series connecting the said other side of the first capacitor to ground, the common sides of the third resistor and the second capacitor being connected to the second guide electrode, a fourth resistor and a gas-filled diode connected in series from the said other side of the first capacitor to ground, the diode serving to increase the slope of the front side of each pulse and also to provide a quick recharge path for the first capacitor, the counting tube having also a plate and ten cathodes evenly spaced about the plate, one of the cathodes being a zero cathode, means providing a reset pulse, a third capacitor to one side of which the reset pulse is impressed, a second gas-filled diode connected on one side to the other side of the third capacitor and on the other side to the zero cathode, a fifth resistor connecting the common point between the third capacitor and the second diode to ground, a rectifier connecting the said common point to ground and permitting flow of electrical current only from the said common point to ground, and a sixth resistor connecting the zero cathode to ground.

17. A counting apparatus for counting electrical pulses, comprising a series of glow-discharge counting tubes, each tube having a series of cathodes, a resistor connecting all but one of the cathodes to ground, a contact arm associated with each counting tube and adapted to make electrical contact with a point between one of the cathodes of the counting tube and its resistor, a thyratron having a plurality of grids, each of the contact arms being connected to a grid, a resistor associated with each contact arm, the resistors being selected of such values that the voltages present on the grids due to the presence of counting tube glow discharges on the cathodes will be sufficient to fire the thyratron only when the glow discharges of all the tubes are directed to the cathodes with which the contact arms make electrical contact, one of the cathodes in each counting tube being a zero cathode one of the counting tubes being intended for high speed operation, means providing a reset pulse, a capacitor to one side of which the reset pulse is impressed, a gas-filled diode connected on one side to the other side of the capacitor and on the other side to the zero cathode of the said one high-speed counting tube, a resistor connecting the common point between the capacitor and the diode to ground, a rectifier connecting the said common point to ground and permitting flow of electrical current only from the said common point to ground, and a resistor connecting the zero cathode of the said one tube to ground.

18. A counting apparatus for counting electrical pulses, comprising a series of counting tubes each having a plate, ten cathodes spaced around the plate, one of the cathodes being a zero cathode, a first guide electrode having an element between each pair of cathodes, a second guide electrode also having an element between each pair of cathodes, the elements between any given pair of cathodes being evenly spaced with one of them closely adjacent to one cathode and the other closely adjacent the other cathode, a first capacitor on one side of which each pulse is impressed, first and second resistors in series connecting the other side of the first capacitor to ground, the common sides of the resistors being connected to the first guide electrode of one of the counting tubes, a third resistor and a second capacitor in series connecting the said other side of the first capacitor to ground, the common sides of the third resistor and the second capacitor being connected to the second guide electrode of the said one counting tube, a gas-filled diode connected in series from the said other side of the first capacitor to ground, the diode serving to increase the slope of the front side of each pulse and also to provide a quick recharge path for the first capacitor, a resistor connecting each cathode to ground, a contact arm associated with each counting tube and adapted to make electrical contact with a point between one of the cathodes of the counting tube and its resistor, a thyratron having a plurality of grids, each of the contact arms being connected to a grid, a resistor associated with each contact arm, the resistors being selected of such values that the voltages present on the grids due to the presence of the counting tube glow discharges on the cathodes will be sufficient to fire the thyratron only when the glow discharges of all the tubes are directed to the cathodes with which the contact arms make electrical contact, means associated with the thyratron providing a reset pulse, a third capacitor to one side of which the reset pulse is impressed, a second gas-filled diode connected on one side to the other side of the third capacitor and on the other side to the zero cathode of the said one counting tube, a fourth resistor connecting the common point between the third capacitor and the second diode to ground, a rectifier connecting the said common point to ground and permitting flow of electrical current only from the said common point to ground, and a fifth resistor connecting the zero cathode of the said one counting tube to ground.

References Cited in the file of this patent

UNITED STATES PATENTS 2,833,476     Hayes _____ May 6, 1958